2 Sheets—Sheet 1.

W. T. LEMON.
Knitting-Machine.

No. 202,840. Patented April 23, 1878.

WITNESSES:
C. Clarence Poole
Bartram Zevely

INVENTOR:
Wm T. Lemon
per Attys
A. H. Evans & Co.

N. PETERS, PHOTO-LITHOGRAPHER, WASHINGTON, D. C.

2 Sheets—Sheet 2.

W. T. LEMON.
Knitting-Machine.

No. 202,840. Patented April 23, 1878.

WITNESSES:
Clarence Poole
Bartram Lively

INVENTOR:
Wm. T. Lemon
per atty.
A. H. Evans & Co.

UNITED STATES PATENT OFFICE.

WILLIAM T. LEMON, OF DETROIT, MICHIGAN.

IMPROVEMENT IN KNITTING-MACHINES.

Specification forming part of Letters Patent No. 202,840, dated April 23, 1878; application filed March 30, 1878.

*To all whom it may concern:*

Be it known that I, WM. T. LEMON, of Detroit, in the State of Michigan, have invented a new and useful Improvement in Knitting-Machines, of which the following is a clear, full, and exact description, reference being had to the accompanying drawings, making a part of this specification, in which—

Figure 2:
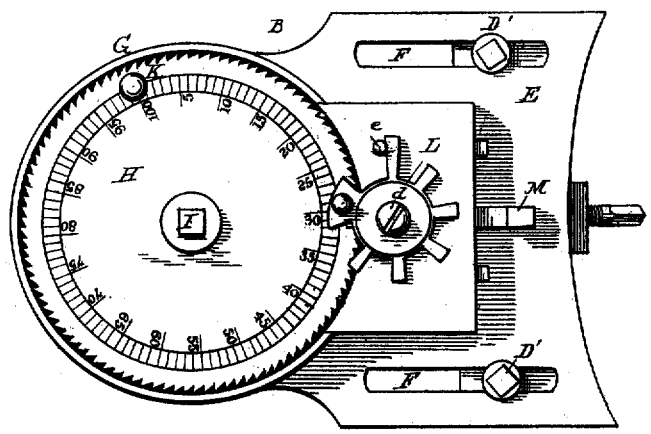
Figure 3:
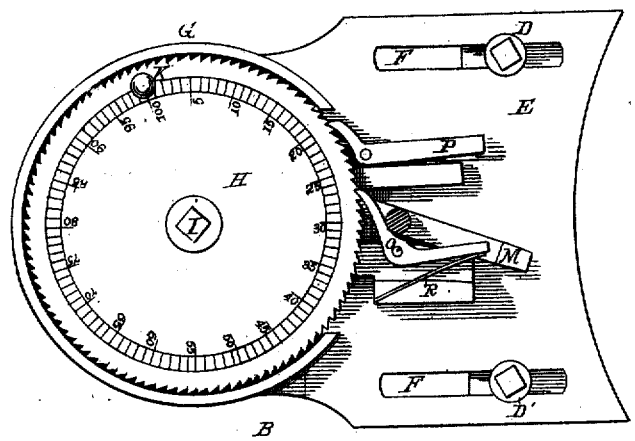
Figure 4:
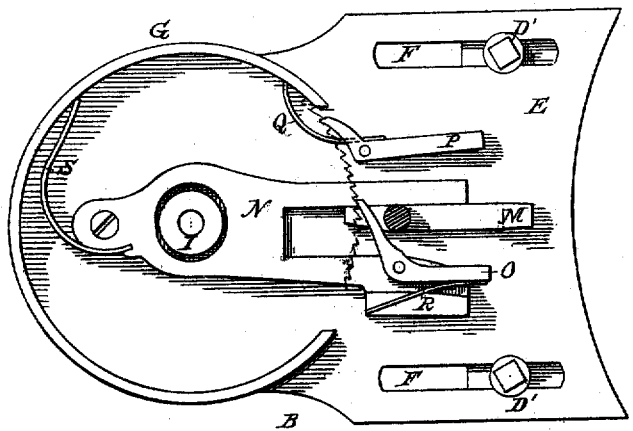
Figure 5:
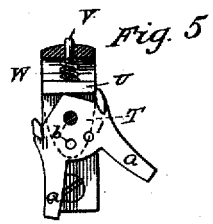

Figure I is a perspective view of a knitting-machine with my improvement attached. Fig. 2 is a plan view of the attachment. Fig. 3 is the same with a portion of the casing removed. Fig. 4 is the same view with the ratchet-wheel removed. Fig. 5 is a detail referred to.

My invention relates to circular-knitting machines; and its object is to register the number of rows of stitches knit, and avoid the labor and loss of time in measuring the work with a rule.

It consists in the several combinations of devices hereinafter explained and claimed.

To enable others skilled in the art to make and use my invention, I will proceed to describe the exact manner in which I have carried it out.

In the drawings, A represents a circular-knitting machine, and B represents my attachment, secured to the lower edge of the knitter-bed by set-screws; or any other equivalent means may be employed. The bed C is formed with a curve, to snugly fit the curve of the lower portion D of the knitter-bed, and, by means of a bent arm passing underneath and within the lower portion of said bed, can be readily secured thereto.

On the bed C is placed the two adjusting-screws D' D', whereby the main plate E, provided with the slots F F, can be adjusted toward or from the knitter, as desired, and for a purpose hereinafter explained.

The main plate E is provided with the circular rim G, within which is placed the ratchet-wheel H, held by the central screw I. This ratchet-wheel is constructed with any desired number of teeth, to cause a complete revolution of the same, and is provided on its face, near the outer circumference, with a scale corresponding with the number of teeth.

In my drawing I show the wheel with one hundred teeth, and a corresponding scale from 1 to 100. On the face of the wheel I place the knob K, which performs three separate and distinct functions. It serves as a convenient handle by which to readily revolve the wheel by hand; it serves to set the wheel, as will be explained hereinafter; and in the revolutions of the ratchet-wheel the knob K comes in contact with the teeth of the wheel L, and causes the latter to revolve and record each hundred rows of stitches formed by the machine.

The ratchet-wheel is operated through the double pivoted lever M, as shown in Figs. 3 and 4. It is evident that whether the outer or long arm of the lever be moved to the right or the left, the effect is the same on the bifurcated arm N. At either movement of the lever the arm is forced to the position shown in Fig. 3, carrying the pawl O with it, and moving forward the wheel H one tooth, where it is held by the pawl P, operated by the spring Q, the pawl O being held by the spring R.

When the bifurcated arm N is released from the pressure of the lever M it is forced back by the spring S to its normal position, as shown in Fig. 4. This withdraws the pawl O over one tooth of the ratchet-wheel, and places it in position to repeat its forward movement, when the lever M is again forced to the right or left.

It will be evident from my construction, as shown in Fig. 3, that the wheel cannot, by any sudden blow, be forced to move beyond one tooth at a time, as the pawl, by its forward movement, is brought in contact with the pivot-screw of the lever, and is held down between the teeth, thus securely arresting any further movement of the wheel until the pawl is withdrawn. By this construction I avoid the possibility of a miscount in the number of rows—a very important consideration.

The lever M is operated by means of a double pawl, T, secured to the revolving cam-ring. This pawl is pivoted in its bearings, as shown in Fig. 5, and has a diamond-pointed head, bearing against a sliding plate, U, provided with a guide-rod, V, and spiral spring W, by which construction I secure the necessary spring motion to the pawl T, so as to bring the arms *a a* alternately into action, as may be desired, to accommodate the reverse motion of the machine, the pawl automatically adjusting itself to suit the change of motion in the knitter. As long as the motion is in the same continuous direction the pawl remains set to strike the lever M on each round of the machine.

Figure 1:
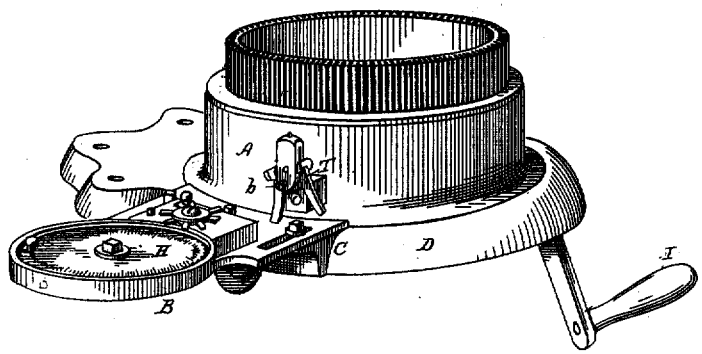

In Fig. 1 the pawl is shown as in the act of passing to the left, and set to strike the end of the lever; and so long as it continues in that direction it remains set, and moves the lever at every revolution, thereby moving the ratchet-wheel one tooth at each revolution, thus counting one on the face of the wheel for each row of stitches made.

When the motion is reversed, the pawl, coming in contact with the end of the lever, reverses its position, and the other arm becomes the operating-pawl.

To adjust the attachment to the machine so that the pawl T will take the right hold on the lever M, and clear it after carrying it the right distance to the right or left, is the purpose of the adjusting-screws D' on the bed C and the slots F in the main plate. It is evident that this adjustment can be readily made.

In the manufacture of stockings and other similar articles, it is well known that the machine is revolved continuously a certain number of times in one direction for the leg, and the motion is then reversed, and the machine runs a certain number of times in the opposite direction for the foot. By this means the wear of the knitter is equalized. And I have explained how the double pawl T alternately and automatically adjusts itself to continue the counting of the rows of stitches. But in knitting the heel and toe of a stocking, the machine receives only a partial revolution, the motion being a reciprocal right-and-left movement. During this part of the knitting, if it be desired to count the rows of stitches, the double pawl is held in position by the small set-screw b, (see Fig. 1,) which enters either of the holes b'. (See Fig. 5.) If counting be not desired during the process of knitting the heels and toes, it is only necessary to withdraw the set-screw b from the holes b', and the pawl will cease to operate the lever during the reciprocal right-and-left movement.

The toothed wheel L is secured by the central screw d, as shown in Fig. 2, and is provided with any number of teeth, so arranged as to have one tooth moved forward and another brought into action on each revolution of the ratchet-wheel H, the knob K or some equivalent device striking the tooth and partially revolving the wheel L, moving one tooth forward, and bringing the next into position to be struck by the knob K on its next revolution. By this means the hundreds of revolutions of the knitter are recorded by the wheel L, the wheel in my machine, as shown in the drawings, being designed to count as high as six hundred revolutions, although practically not over four hundred are counted in knitting of the average stockings.

To set my attachment for work, it is only necessary to bring the long tooth of the wheel L against the stop e, as shown in Fig. 2, and then bring around the ratchet-wheel H until the knob K stands in rear of the broad tooth on wheel L. This is quickly done, and without any calculation. The knitter is then put in operation, and the counting of the revolutions of the machine or of the rows of stitches is absolutely correct, so that stockings and similar articles can be knitted in pairs of precisely the same length without the loss of labor and time necessary in measuring by rule.

Having thus described my invention, what I claim as new, and desire to secure by Letters Patent, is—

1. In a knitting-machine, the bifurcated arm N, pivoted lever M, and pawl O, in combination with the ratchet-wheel H and pawl P, provided with the spring Q, whereby the ratchet-wheel is rotated when the lever M is moved in either direction, substantially as and for the purpose set forth.

2. The bifurcated arm N, carrying the pawl O, in combination with the pivoted lever M and ratchet-wheel H, all being constructed and relatively arranged substantially as and for the purpose set forth.

3. In a knitting-machine, the bifurcated arm N, pivoted lever M, pawls O and P, and ratchet-wheel H, in combination with the double pawl T, and mechanism for supporting and operating the same, all constructed and relatively arranged substantially as and for the purpose set forth.

4. In a knitting-machine, the main plate E, provided with the rim G and slots F, in combination with the bed C, provided with the adjusting-screws D' D', all constructed and arranged substantially as and for the purpose set forth.

5. The ratchet-wheel H, with its knob K and operating mechanism, in combination with the toothed wheel L, whereby the said knob serves to revolve and aid in setting the said ratchet, as well as to revolve the wheel L, substantially as and for the purpose set forth.

6. The ratchet-wheel H, with its knob K and operating mechanism, in combination with the wheel L and stop e, substantially as and for the purpose set forth.

WILLIAM T. LEMON.

Witnesses:
W. F. MORSELL,
BERTRAM ZEVELY.